United States Patent

Suda et al.

[11] Patent Number: 6,088,060
[45] Date of Patent: *Jul. 11, 2000

[54] AUTOMATIC FOCUSING DEVICE

[75] Inventors: Hirofumi Suda; Masamichi Toyama; Akihiro Fujiwara, all of Kanagawa-ken; Kunihiko Yamada, Tokyo, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/823,607

[22] Filed: Mar. 25, 1997

Related U.S. Application Data

[63] Continuation of application No. 08/684,335, Jul. 19, 1996, abandoned, which is a continuation of application No. 08/334,700, Nov. 4, 1994, abandoned, which is a continuation of application No. 08/200,372, Feb. 15, 1994, abandoned, which is a continuation of application No. 08/070,657, Jun. 1, 1993, abandoned, which is a continuation of application No. 07/892,560, Jun. 2, 1992, abandoned, which is a continuation of application No. 07/634,329, Dec. 26, 1990, Pat. No. 5,128,768, which is a continuation of application No. 07/506,670, Apr. 9, 1990, abandoned, which is a continuation of application No. 07/240,915, Sep. 6, 1988, abandoned.

[30]     Foreign Application Priority Data

Sep. 11, 1987  [JP]  Japan .................................. 62-228147
Sep. 11, 1987  [JP]  Japan .................................. 62-228148

[51] Int. Cl.[7] ............................ H04N 5/232; G03B 13/00
[52] U.S. Cl. .......................... 348/350; 348/352; 348/355
[58] Field of Search ..................................... 348/170, 350, 348/345, 349, 352, 351, 354, 355; 396/95, 96, 121, 123, 124; H04N 5/232; G03B 13/00

[56]             References Cited

U.S. PATENT DOCUMENTS

| 4,405,940 | 9/1983 | Woolfson et al. | 348/170 |
| 4,409,661 | 10/1983 | Romanski | 358/125 |
| 4,644,397 | 2/1987 | Roy et al. | 358/125 |
| 4,701,782 | 10/1987 | Duvent | 358/227 |
| 4,794,459 | 12/1988 | Moberg et al. | 358/227 |
| 4,796,187 | 1/1989 | North | 358/126 |
| 4,872,058 | 10/1989 | Baba et al. | 348/352 |
| 5,031,049 | 7/1991 | Toyama | 358/227 |
| 5,031,449 | 7/1991 | Toyama et al. | 358/227 |
| 5,128,768 | 7/1992 | Suda et al. | 358/227 |

FOREIGN PATENT DOCUMENTS

| 60-120675 | 6/1985 | Japan . |
| 60-126976 | 7/1985 | Japan . |
| 61-018271 | 1/1986 | Japan . |

*Primary Examiner*—Wendy Garber
*Assistant Examiner*—Ngoc-Yen Vu
*Attorney, Agent, or Firm*—Robin, Blecker & Daley

[57]            ABSTRACT

An automatic focusing device for automatically controlling the focused state of an optical system on the basis of a video signal obtained within a focus detecting area which is set on an image sensing plane comprises: a tracing area setting circuit arranged to movably set, within said image sensing plane, an inner tracing area and an outer tracing area which surrounds the inner tracing area; a computing circuit arranged to compute information on a difference in a given frequency component of the video signal obtained from the inner and outer tracing areas in each of their different positions to which they are moved within the image sensing plane; determining means for determining the position or size of an object's image formed within the image sensing plane from the difference information computed by the computing circuit; and a circuit which is arranged to shift the focus detecting area to the position of the object's image determined by the determining circuit and to change the size of the focus detecting area according to the size of the object's image.

19 Claims, 15 Drawing Sheets

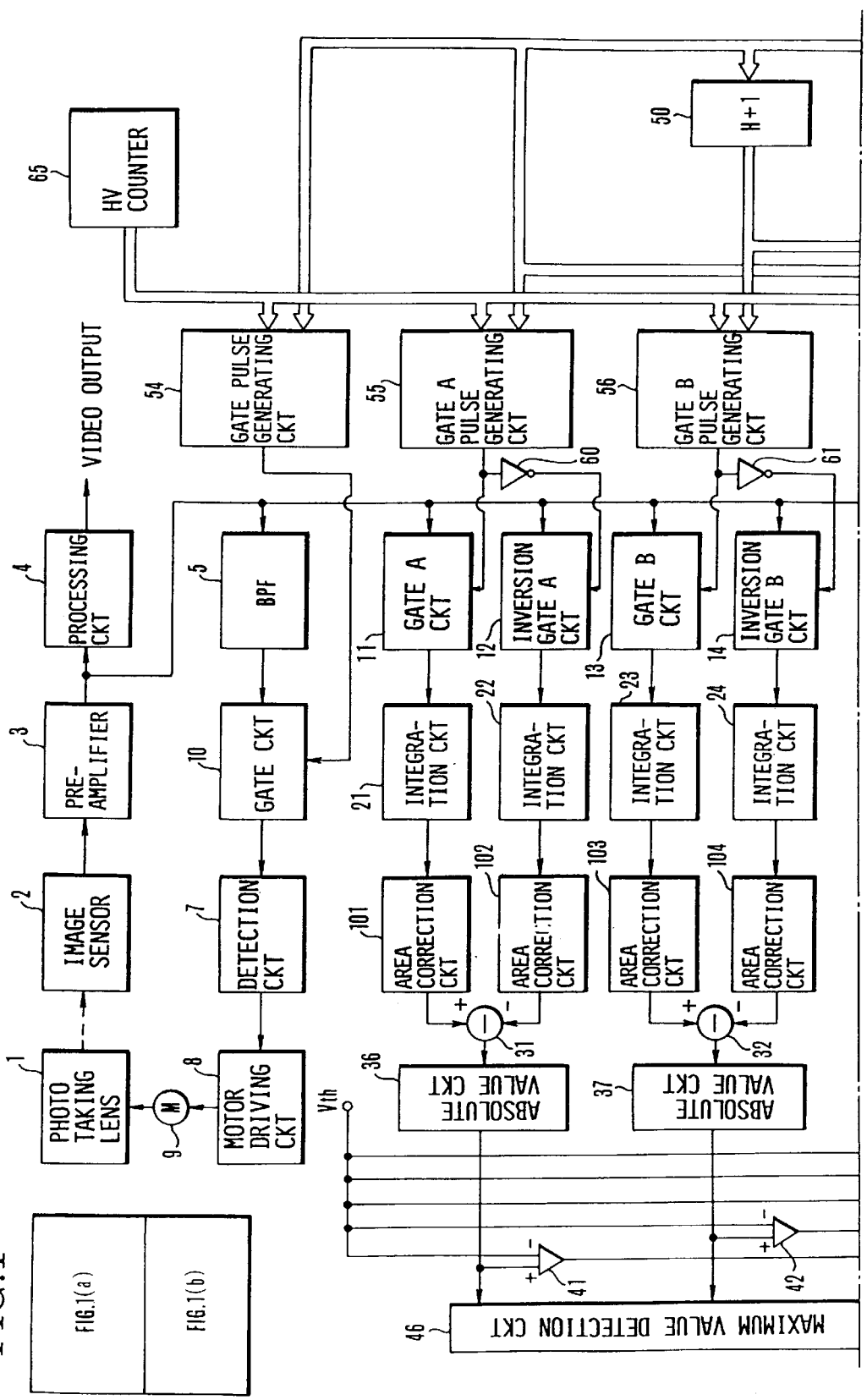

GATE F
GATE G
FOCUS DETECTING AREA (NARROW)
FOCUS DETECTING AREA (WIDE)

GATE F
GATE G

GATE F
(FOCUS DETECTING AREA-WIDE)

GATE F

GATE G

GATE G
(FOCUS DETECTING
AREA-NARROW)

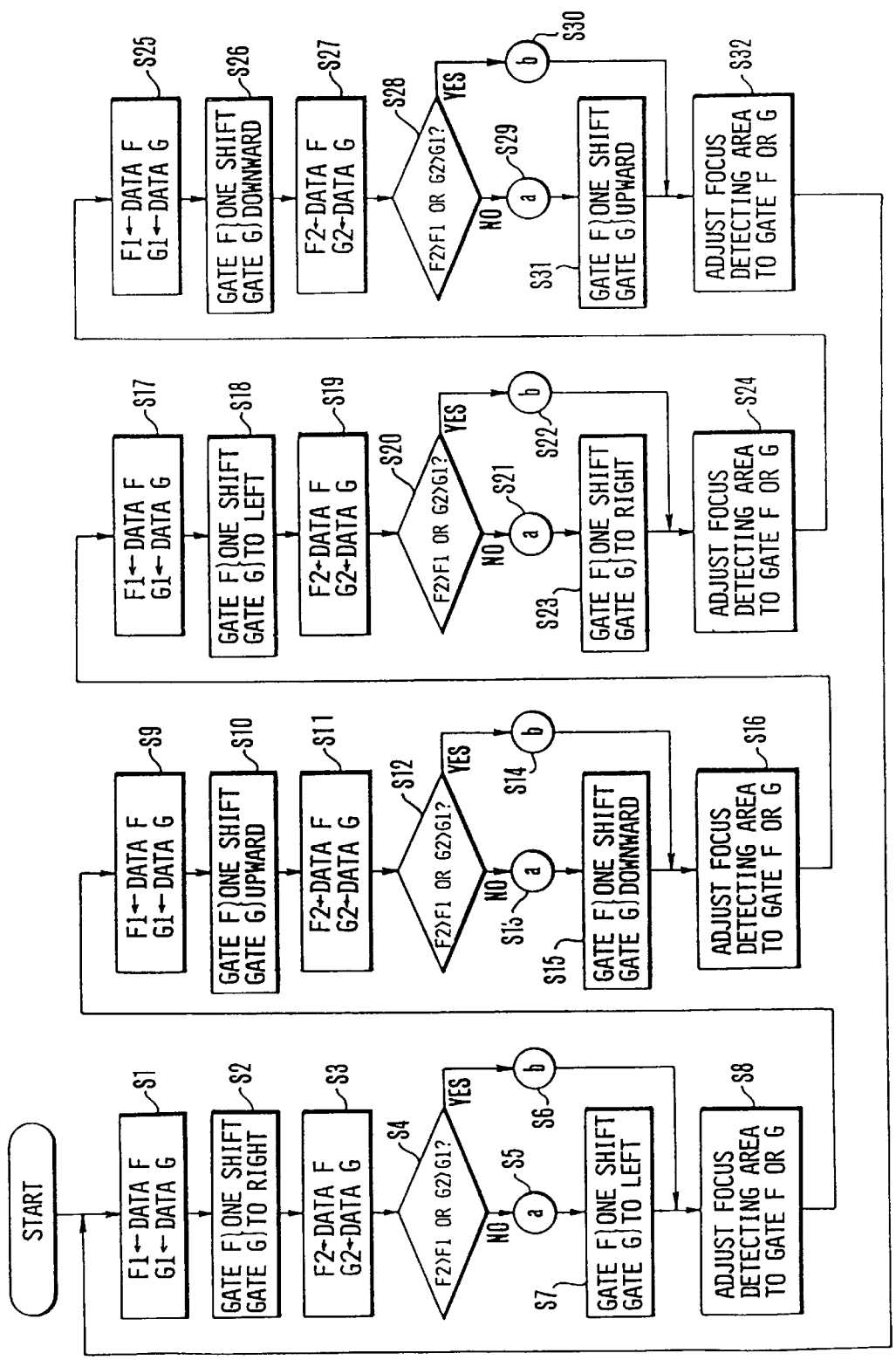

AUTOMATIC FOCUSING DEVICE

This is a continuation application under 37 CFR 1.62 of prior application Ser. No. 08/684,335, filed Jul. 19, 1996 (abandoned), which is a cont. of Ser. No. 08/334,700, filed Nov. 4, 1994 (abandoned), which is a cont. of Ser. No. 08/200,372, filed Feb. 15, 1994 (abandoned), which is a cont. of Ser. No. 08/070,657, filed Jun. 1, 1993 (abandoned), which is a cont. of Ser. No. 07/892,560, filed Jun. 2, 1992 (abandoned), which is a cont. of Ser. No. 07/634,329, filed Dec. 26, 1990 U.S. Pat. No. 5,128,768), which is a cont. of Ser. No. 07/506,670, filed Apr. 9, 1990 (abandoned), which is a cont. of Ser. No. 07/240,915, filed Sep. 6, 1988 (abandoned).

BACKGROUND OF THE INVENTION

1. Field of the Invention

This invention relates to an improvement on an automatic focusing device which converts the image of an object into a video signal by means of a two-dimensional image sensor, etc. and adjusts the focal point of a photo taking lens on the basis of this video signal.

2. Description of the Related Art

There has been known a method for automatically controlling a video camera into an in-focus state by detecting the degree of definition of an image formed on the image sensing plane by detecting the high frequency component of a video signal and by controlling the position of the lens of the camera in such a way as to obtain a maximum degree of the definition (high frequency component). The method is based on the concept: The video signal conspicuously changes at the edge part of the image of an object thus resulting in an increase in the high frequency component of the video signal. This high frequency component increases accordingly as the object's image is closer to an in-focus state.

FIG. 12 of the accompanying drawings shows in outline the arrangement of the conventional automatic focusing device of this kind. Referring to FIG. 12, a photo taking lens 1 forms an object's image on the image sensing plane of an image sensor 2. The image is converted into an electrical (video) signal by the image sensor 2. A preamplifier 3 which operates at the ensuing stage amplifies the video signal coming from the image sensor 2. The amplified video signal is supplied to a processing circuit 4 and a band-pass filter (BPF) 5. The processing circuit 4 perform s a signal processing operation in a predetermined process and produces the received signal as a standard TV signal (video signal). Meanwhile, the band-pass filter 5 extracts a high frequency component from the output of the preamplier 3 and supplies it to a gate circuit 6. By this, only a signal in an area that is to be used for focus detection within one picture (consisting of one field or one frame) of the video signal is selected and allowed to pass the gate circuit 6. A detection circuit 7 performs a detecting operation on the output of the gate circuit 6. The circuit 7 then forms and produces a signal indicative of a maximum amplitude value, i.e. a peak value, at a point of the signal area abounding with the high frequency component. The signal produced from the detection circuit 7 represents the focused degree of the photo taking lens 1. The greater the value of this signal, the nearer the photo taking lens 1 to an in-focus state. A motor driving circuit 8 is arranged to drive a motor 9 to shift the photo taking lens 1 according to the output value of the signal from the detection circuit 7. The lens 1 is thus automatically brought into an in-focus state.

This method has long been known by the name of "Hill Climbing Control Method," which is described in "NHK Gijutsu Kenkyu Hokoku", 1965, Vol. 17, No. 1 (Whole No. 86), p 21. However, the area of video signal to be allowed to pass by the gate circuit 6, that is, a focus detecting area is fixedly set in the middle part of the image plane. Therefore, there has been a fear that, in cases where the position of a main object changes within the image plane as a result of some movement of either the object or the camera, the lens might be focused on a wrong object the image of which comes to the middle of the image plane under such a condition.

To solve this problem by allowing the lens to be continuously focused on the main object even in the event of occurrence of a change in the position of the main object within the image plane, a patent application has been filed for an invention whereby a feature of a main object appearing on the image sensing plane is detected; any movement of the main object is detected on the basis of the feature detected; and the focusing area is arranged to trace the moving main object.

U.S. patent application Ser. No. 737,163, filed May 23, 1985, now abandoned, discloses an example of a device of the above stated kind. In this case, a distance measuring frame, i.e. the focus detecting area, is moved according to any change taking place in the feature of the object's image with the feature of the object's image extracted from a chrominance signal. U.S. patent application Ser. No. 106, 427 filed Oct. 8, 1987 discloses another example of such a device, wherein: The image measuring frame is arranged to be shifted in such a way as to adjust the center of the frame to a point on the image sensing plane where the peak value of the high frequency component is detected.

The focus detecting area (or a distance measuring frame) on the image sensing plane is arranged to be set by the area of the video signal allowed to pass through the gate circuit 6. Meanwhile, the conventional device may be divided into two types. One has the focus detecting area arranged to be a relatively wide area within the image (sensing) plane. The other has the focus detecting area arranged to be a relatively narrow area in the middle of the image plane. However, these types have presented the following problems: In the former, some objects other than a main object might be brought into the focus detecting area either by its movement or by the movement of the camera. In that event, the lens might be focused on a wrong object instead of the main object. In the case of the latter, while no wrong object is likely to come into the focus detecting area, a main object of focusing tends to come out of the focus detecting area thus frequently necessitating the restart of a focusing action. This appears for the photographer to be an inadequate focusing action. The possibility of having such a restart, therefore, must be eliminated.

In respect of this, a device for making the size of the focus detecting area variable has been disclosed in U.S. patent application Ser. No. 154,078 filed Feb. 9, 1988. According to the disclosure, the moving extent of the image is detected and a period of time during which the automatic focusing action is to be inhibited is controlled according to the value of the moving extent; the use of a filter which determines a focus detecting characteristic is changed over to another filter according to the moving extent of the image; and the distance measuring area (focus detecting area) is changed over to another area according to the moving extent of the image.

In addition to the above stated device, devices arranged to make the size of the distance measuring area variable have been disclosed also in Japanese Patent Applications Laid-Open No. SHO 60-126976, SHO 60-120675 and SHO 61-18271, etc. However, after the disclosure of the prior art devices, research and development work in this connection has been furthered by the inventors. As a result, a method for improvement over these devices has been developed. In accordance with this method, changes in the position and size of the object can be detected at a higher degree of accuracy without being affected by changes in the position and size of the object and the influence of the background; and the changes detected can be reliably traced.

SUMMARY OF THE INVENTION

This invention is directed to the solution of the above stated problems of the prior art. It is also a first object of the invention to provide an improvement over the methods disclosed in the prior applications mentioned in the foregoing and to further the degrees of accuracy and reliability of them.

It is a second object of the invention to provide an automatic focusing device which is capable of continuing its focusing action on a main object by tracing the image of the main object on an image sensing plane even when the object's image moves.

To attain this object, an automatic focusing device arranged as a preferred embodiment of the invention comprises: area setting means for setting, on an image sensing plane, a tracing inner area and a tracing outer area surrounding the inner area in such a way as to have the positions of both the areas movable; computing means for computing information on a difference between levels of a given focused-degree-indicating component of a video signal obtained at each of varied positions of the tracing inner and outer areas moved within the image sensing plane; determining means for determining the location of an object within the image sensing plane from the difference information computed by the computing means; and focus detecting area shifting means for shifting a focus detecting area to the object's location within the image sensing plane determined by the determining means. When a main object to be photographed is determined to have moved in the direction of increasing the difference in the given component between the tracing inner area and the tracing outer area, i.e. a luminance component or the high frequency component on the high band side thereof, the focus detecting area is shifted to the new position of the main object.

It is a third object of this invention to provide an automatic focusing device which is capable of continuing its focusing action on main objects of varied sizes by tracing changes occurring in size of the main objects without being affected by objects other than the main objects.

To attain the above stated object, an automatic focusing device arranged as a preferred embodiment of the invention comprises: area setting means for setting, within an image sensing plane, an inner area in a variable size and an outer area in a state of surrounding the inner area; computing means for computing information on a difference in a given component of a video signal between the video signal obtained from the inner area at each of varied sizes thereof and the video signal obtained from the outer area at each of varied sizes thereof; determining means for determining the size of a photographed object within the image sensing plane from each difference information computed by the computing means; and focus detecting area size changing means for changing the size of a focus detecting area according to the size of the object determined by the determining means. The device is thus arranged to change the size of the focus detecting area according to the size of the object determined by the determining means. In other words, the focus detecting area is widened when the object appears in a relatively large size on the image sensing plane and to narrow it when the object appears in a relatively small size.

It is another object of the invention to provide an automatic focusing device which is capable of continuing a focusing action by following up changes occurring in the location and the size of the image of a main photographed object on an image sensing plane.

It is a further object of the invention to provide an automatic focusing device which is capable of tracing the displacement of a photographed object always in optimum conditions by changing, according to the conditions of the object, a video signal component which is used for detection of changes occurring in the location and the size of the object on an image sensing plane.

It is a further object of the invention to provide an image recognizing device which is capable of detecting without fail changes occurring in the location, size, etc. of an image of a photographing object on an image sensing plane.

Other objects and features of this invention will become apparent from the following description of embodiments thereof and the accompanying drawings.

BRIEF DESCRIPTION OF THE DRAWINGS

FIGS. 1, 1(a) and 1(b) are block diagrams showing a first embodiment of this invention.

FIGS. 9(a) to 9(c) are flow charts showing the operation of the third embodiment.

DETAILED DESCRIPTION OF THE PREFERRED EMBODIMENTS

Figure 2:
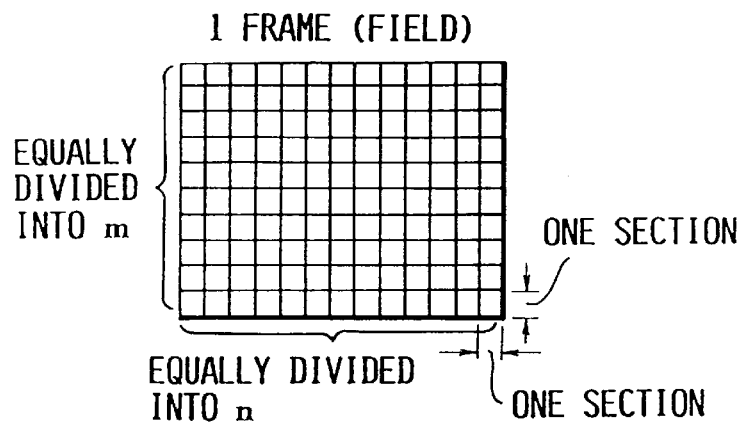
FIG. 2 shows an image sensing plane as in a divided state.

The following description of embodiments with reference to the accompanying drawings shows the details of this invention. As shown in FIG. 2, an image sensing plane is equally divided into n parts in the horizontal direction and into m parts in the vertical direction to obtain n X m sections. An object tracing area is arranged to be movable with each of these divided sections regarded as units of the moving extent of the moving area.

Figure 1B:
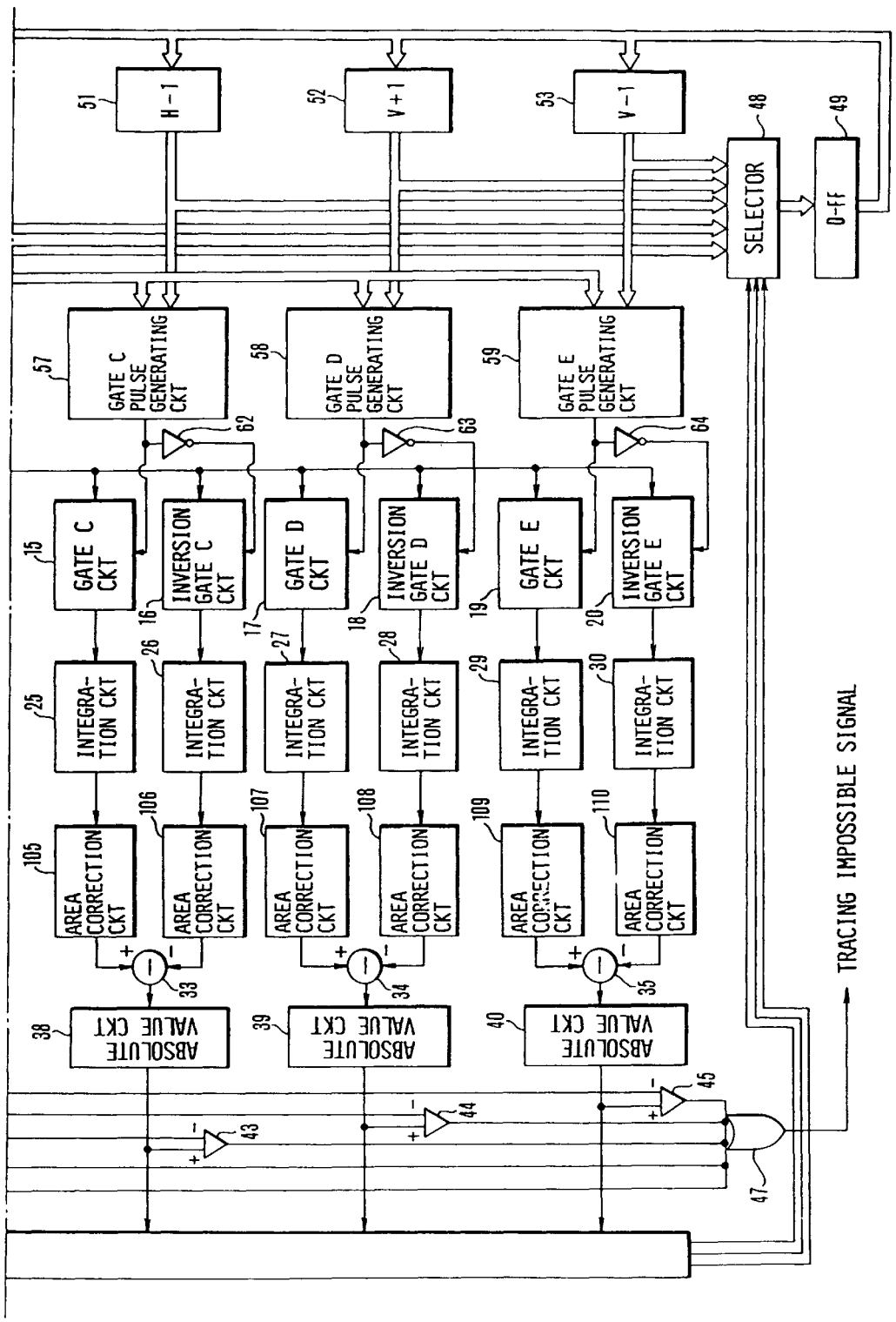
Figure 12:
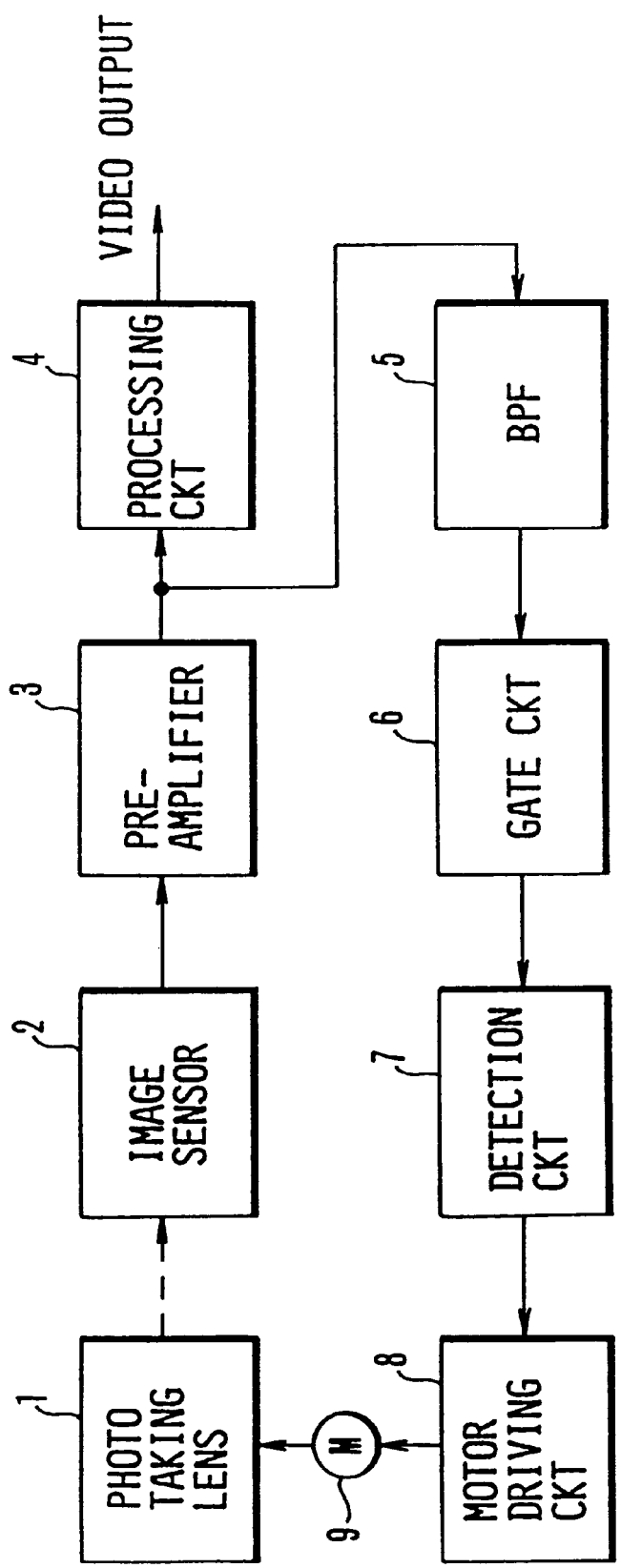
FIG. 12 is a block diagram showing the conventional automatic focusing device.

FIGS. 1 including FIGS. 1(a) and 1(b) shows a first embodiment of the invention in block diagrams. The same component parts as those of the conventional device shown in FIG. 12 are indicated by the same reference numerals. Referring to FIGS. 1(a) and 1(b), a video signal (a luminance component) which is produced from an image sensor 2 via a preamplifier 3 is arranged to be supplied to a gate A circuit 11 from the preamplifier 3. The gate A circuit 11 is arranged to allow to pass there a video signal part of a designated area within one field according to a gate pulse coming from a gate A pulse generating circuit 55. The output of the circuit 11 is applied to an integration circuit 21. An inversion gate A circuit 12 is arranged to obtain a video signal part of another designated area other than the area designated by the gate A circuit 11 (a remaining area obtained after removal of the designated area first stated above from the whole image plane) within one field according to a gate pulse, which is produced from a gate A pulse generating circuit 55 and is inverted by an inverter 60. The inversion gate A circuit 12 then applies it to an integration circuit 22. The integration circuits 21 and 22 are arranged to perform integrating actions only on the video signal parts of the areas designated by the gate A circuit 11 and the gate B circuit 12 respectively. Averaged luminance component values of the video signal parts of these areas are obtained by the integration circuits 21 and 22. These average or mean values are normalized by area correction circuits 101 and 102, because: The average value of one area cannot be compared with that of another as the sizes of areas located inside and outside of each designated area differ from each other. These signals are supplied to a subtraction circuit 31. The subtraction circuit 31 then computes difference information between the averaged luminance component values obtained via the area correction circuits 101 and 102 from the integration circuits 21 and 22. The difference information thus obtained is supplied to an absolute value circuit 36. The absolute value circuit 36 is arranged to obtain the absolute value of the difference information and supplies the absolute value to a comparator 41 and a maximum value detection circuit 46.

Following this, the video signal parts produced from the preamplifier 3 are likewise supplied one after another to a gate B circuit 13, a gate C circuit 15, a gate D circuit 17 and a gate E circuit 19. Each of these gate circuits 13, 15, 17 and 19 is arranged to allow to pass there the video signal part of a designated area within one field according to a gate pulse from a gate B pulse generating circuit 56, a gate C pulse generating circuit 57, a gate D pulse generating circuit 58 or a gate E pulse generating circuit 59. The video signal part of the designated area is applied to an integration circuit 23, 25, 27 or 29. Each of an inversion gate B circuit 14, an inversion gate C circuit 16, an inversion gate D circuit 18 and an inversion gate E circuit 20 is arranged to pass a video signal part of a designate area obtained by removing the above stated designated area from the image sensing plane within one field according to a gate pulse inverted by an inverter 61, 62, 63 or 64 and to apply it to an integration circuit 24, 26, 28 or 30. The integration circuits 23 to 30 integrate the video signal inputs to obtain a mean value of the luminance component obtained in each area. The mean values thus obtained are normalized at area correction circuits 103 to 110. The normalized signals thus obtained are supplied to subtraction circuits 32, 33, 34 and 35. These circuits 32 to 35 compute and obtain difference information between the mean values of the luminance component. The difference information thus obtained is supplied to absolute value circuits 37, 38, 39 and 40. The absolute value circuits 37 to 40 then obtain the absolute values of the input difference information. The absolute values thus obtained are supplied to comparators 42, 43, 44 and 45 and the maximum value detection circuit 46.

Figure 3:
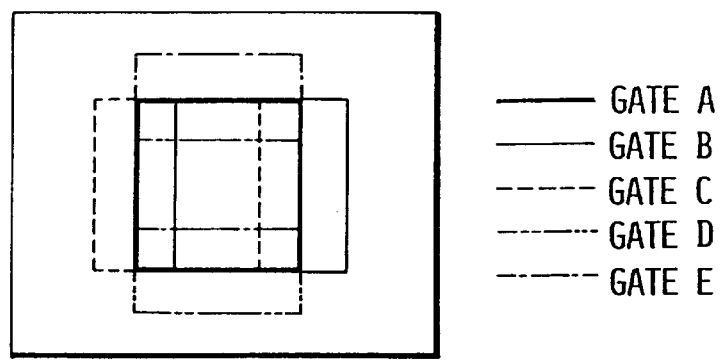
FIG. 3 shows a tracing gate obtained by the embodiment shown in FIGS. 1, 1(a) and 1(b).

The above stated operation gives mean values of the luminance component obtained from areas located on the inner and outer sides of five gates A to E which form a boundary between the two (inner and outer) areas of the image sensing plane; and supplies the maximum value detection circuit 46 with the absolute values of differences between the mean values of the luminance component of the inner and outer areas of the image sensing plane. Upon receipt of these signal inputs, the maximum value detection circuit 46 detects the input having the highest level among the five inputs. The circuit 46 then produces information indicating which of the absolute values obtained from the gates A to E has become the largest value (which corresponds to the location on the image sensing plane of the main object). This information is supplied to a selector 48. The selector 48 is arranged to receive the output of a D flip-flop 49 and the outputs of gate pulse position shift circuits 50, 51, 52 and 53 which give information on positions obtained within the divided image planes of the gates B to E. The selector 48 detects position information corresponding to information designated by the maximum value detection circuit 46. The position information thus detected is supplied to the D flip-flop 49. The D flip-flop 49 is arranged to produce the input position information as information showing the area on the inner side of the gate A (sectional position). The information from the D flip-flop 49 is renewed for every field. Each of the gate pulse position shift circuits 50 to 53 is arranged to produce the position information of the gate A received from the D flip-flop 49 by shifting it to the right, to the left, upward or downward to an extent corresponding to one of the divided sections. The arrangement is such that the relation among the gate A and other gates B, C, D and E which are set around the gate A becomes as shown in FIG. 3. More specifically, the gates B to E are set in positions each of which is shifted from the outside of the gate A to the right, to the left, upward or downward to an extent corresponding to one of the n X m divided sections. As mentioned above, the information produced from the D flip-flop 49 is renewed for every frame. Therefore, in case that the gate D is selected by the selector 48, for example, information corresponding to the position of the gate D is changed to position information corresponding to the gate A of FIG. 3 for a next field and is produced from the D flip-flop 49. Further, the pulse position information of gate A is supplied not only to the gate pulse generating circuit 55 but also to the gate pulse generating circuit 54. Therefore, the position of the focus detecting area set by the gate circuit 10 is always equal to that of the above stated gate A. However, the size of the focus detecting area does not have to be equal to the inside area of the gate A as long as their centers approximately coincide with each other.

In the case of the first embodiment, the focus detecting area is controlled to be set at the gate that has the largest value of a difference between the mean luminance values obtained inside and outside of the gate among the gates A to E. The difference between the inside and outside luminance values of each of the gates A to E is in the following relation to the main object to be photographed: On the image sensing plane, the luminance component is distributed in a greater amount to a part having the object's image and in a smaller amount to parts other than the object part. Therefore, the object's image may be considered to be located approximately within a designated area when the designated area has a maximum value of the difference between the mean luminance values obtained inside and outside of the designated area. In other words, any gate that has the largest difference value between the outside and inside mean luminance values among the gates A to E can be regarded as best having the object's image in its middle part. Hence, the focus detecting area can be kept at the main object's image by bringing the center of the focus detecting area to the center of the gate best having the object's image in the middle part thereof.

Assuming that the focus detecting area is at the gate A, a gate pulse indicative of the position of the inside area of the gate A is produced from the gate pulse generating circuit 54. The gate circuit 10 allows to pass therethrough the video signal of the designated area within one field according to the gate pulse. The detection circuit 7 detects the video signal and holds the peak value of the absolute value signal of the luminance component obtained in the area. A motor driving circuit 8 drives a motor 9 in accordance with the peak value. With the motor 9 driven in this manner, a photo taking lens 1 is automatically adjusted into an in-focus state.

The absolute values supplied to the comparators 41 to 45 are compared with a threshold value Vth. If all the absolute values are found to be lower than the threshold value Vth, a low level signal indicative of impossibility of a tracing action is produced from an OR gate 47. With the tracing impossible signal generated, the device comes to bring the focus detecting area, for example, into a broadened state with the middle part thereof fixed.

Figure 4:
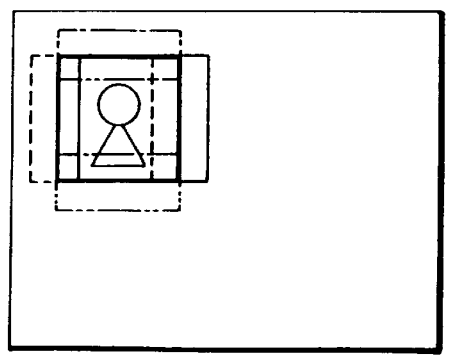
FIG. 4 shows the tracing gate in relation to a focus detecting area.

The five gates A to E are renewed in such a manner that the gate having the largest absolute value of a difference between mean luminance component values obtained on the inside and outside areas of the gate becomes the gate A for a next field. The focus detecting area is shifted as shown in FIG. 4, for example, accordingly as the location of the main object's image on the image sensing plane changes in such a way as to have the center of the focus detecting area coincide with that of the inside area of the gate A. This arrangement enables the focusing device to continue its focusing action on the main object by tracing the object even when the main object's image moves within the image sensing plane.

Figure 5:
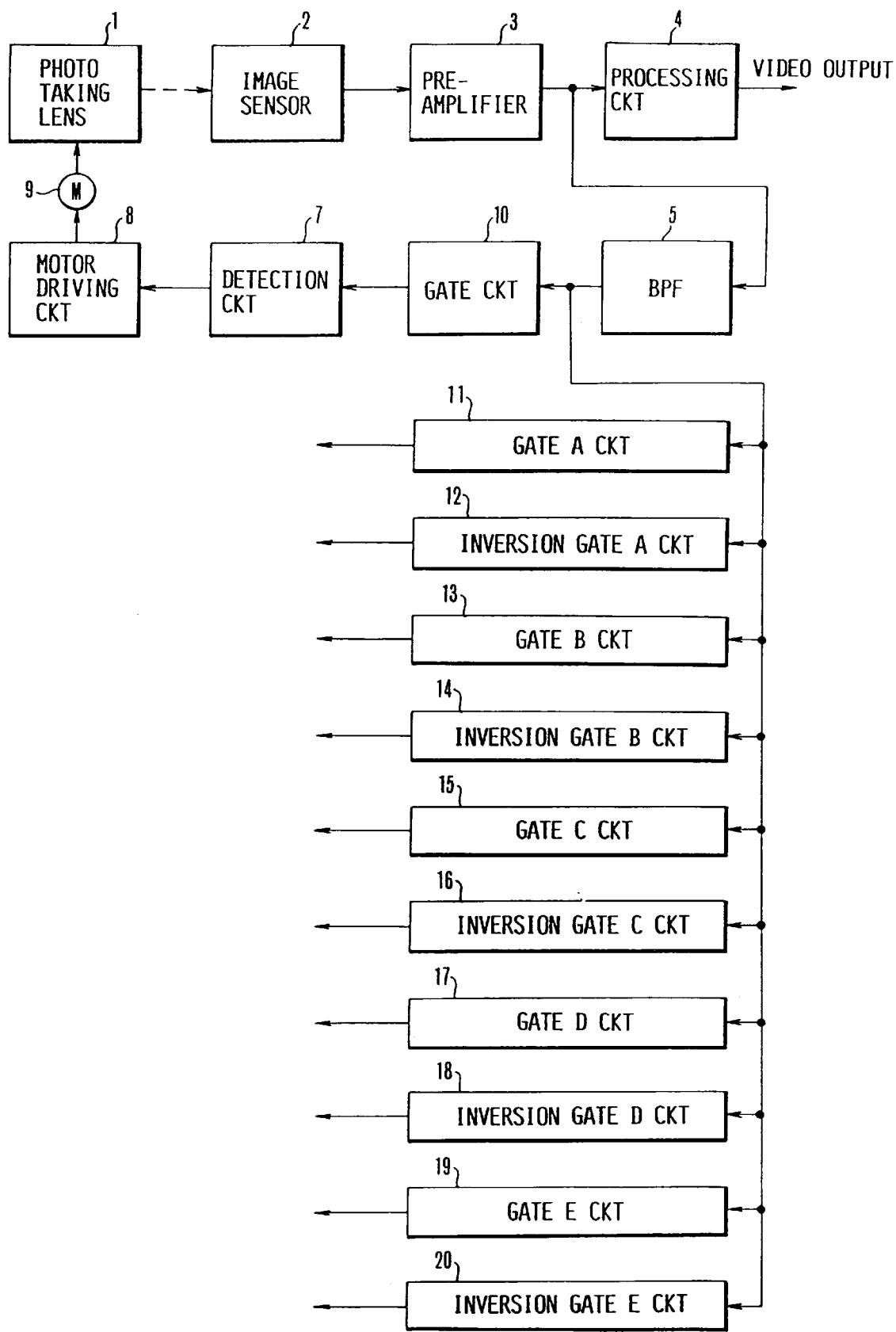
FIG. 5 is a block diagram showing in part a second embodiment of the invention.

In the embodiment described, changes in the position of the main object's image within the image sensing plane is arranged to be detected on the basis of the video signal, i.e. the luminance component thereof, obtained from the image sensor 2 via the preamplifier 3 before passing through a band-pass filter 5. Then, the position of the focus detecting area is determined according to the positional change of the object detected. However, the frequency band of the luminance component is wide. In actuality, therefore, the change might be offset and fail to appear under the condition obtained by taking the mean values of the luminance component even when the frequency band is changed in part by a change occurred in the position of the main object's image. This problem can be solved by the second embodiment of the invention which is arranged as shown in FIG. 5. In the case of FIG. 5, the signal component which is extracted from the inside and outside areas of each gate and to be used as the base of detecting the positional change of the main object is arranged to be taken out from the output side of the band-pass filter 5, in such a way as to use, as the signal component, a high frequency component located on the high band side of the luminance component. This method is based on the concept that: The high frequency component is distributed in a greater degree to the detail and contour parts of an object's image. Therefore, such a change in the position of the main object's image that cannot be detected by the mean values obtained from the wide band of the luminance component can be detected by taking out and comparing the values of the high frequency component values. This method is therefore also advantageous. FIG. 5 shows only the circuit elements required for extracting the high frequency component, including from a gate A circuit 11 up to an inversion gate E circuit 20. Although they are not shown, other circuit elements are arranged and operate in exactly the same manner as in the case of FIG. 1.

Figure 6:
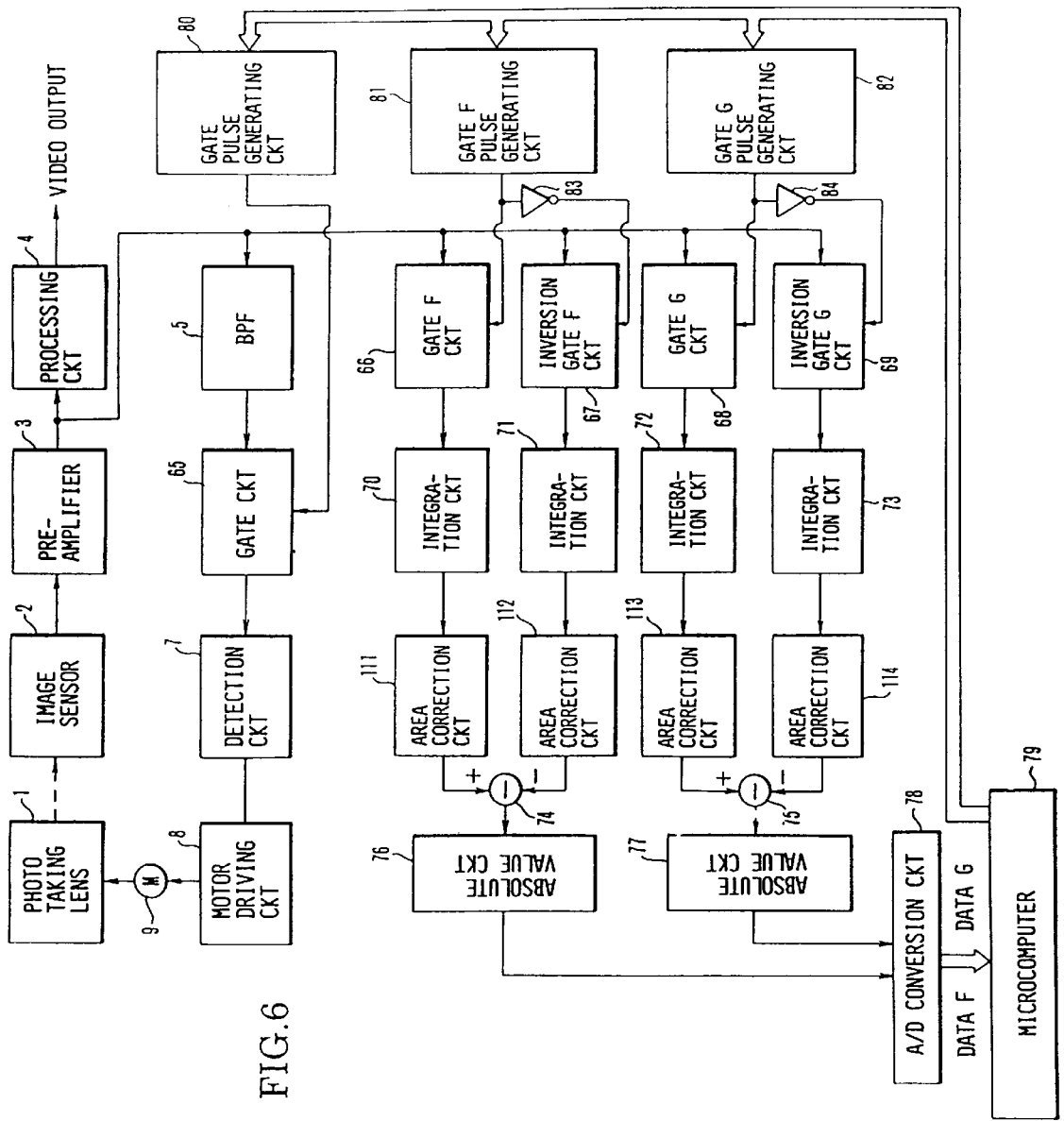
FIG. 6 is a block diagram showing a third embodiment of the invention.

In the case of the first embodiment shown in FIGS. 1, 1(*a*) and 1(*b*), the focusing action is arranged to be continuously performed on the main object by shifting the gates A to E to detect the position of the main object's image on the image sensing plane and by adjusting the focus detecting area to the detected position of the main object's image. However, in cases where the size of the main object's image changes within the image sensing plane, it might become difficult to perform an accurate focusing action. In view of this problem, a third embodiment of the invention is arranged to provide gates F and G which are of different sizes and to perform control by taking into consideration the size of the main object's image as well as the movement thereof. FIG. 6 shows the third embodiment. In FIG. 6, the same parts as those of FIG. 12 are indicated by the same reference numerals.

Referring to FIG. 6 which shows the third embodiment, when a luminance signal is supplied from the image sensor 2 via the preamplifier 3 to a gate F circuit 66, the gate F circuit 66 obtains a luminance signal of a designated area within one field according to a gate pulse produced from a gate F pulse generating circuit 81 which forms a gate pulse in a position instructed by a microcomputer 79. The luminance signal is applied to an integration circuit 70 and an area correction circuit 111. Further, an inversion gate F circuit 67 is arranged to obtain a luminance of a designated area which is opposite to the area designated by the gate F circuit 66 within one field according to a gate pulse produced from the gate F pulse generating circuit 81 and inverted by an inverter 83 (an area obtained by removing from the image sensing plane the area designated by the gate F circuit 66). The luminance signal is applied to an integration circuit 71 and an area correction circuit 112. A gate G circuit 68 is arranged, like the gate F circuit 66, to obtain a luminance signal of a designated area within one field according to a gate pulse from a gate G pulse generating circuit 82 which forms a gate pulse for a position instructed by the microcomputer 79. The luminance signal is applied to an integration circuit 72 and an area correction circuit 113 one after another. An inversion gate G circuit 69 is arranged to obtain a luminance signal of a designated area which is opposite to the area designated by the gate G circuit 68 within one field according to a gate pulse obtained from the gate G pulse generating circuit 82 and inverted by an inverter 84. The luminance signal from the inversion gate G circuit 69 is applied to an integration circuit 73 and an area correction circuit 114. The above stated designated areas are an inner area and an outer area which are divided by gates F and G each of which serves as a boundary line dividing the image plane into two areas. As shown in FIG. 7(*a*), these areas are of different sizes (including different numbers of divided sections shown in FIG. 2) while their centers are located at the same point. However, the positions of both the gates F and G on the image sensing plane are arranged to be variable.

The integration circuits 70, 71, 72 and 73 are arranged to receive only the luminance components of the areas designated by the gate F circuit 66, the inversion gate F circuit 67, the gate G circuit 68 and the inversion gate G circuit 69 respectively. Each of these integration circuits integrates the luminance component thus received and to obtain the mean value of the luminance component obtained within the applicable area.

Since the inside and outside areas defined by each of the gates F and G differ in size, the area correction circuits 111, 112, 113 and 114 cannot be allowed to compare the outputs of the integration circuits 70 to 73 as they are. Therefore, each of the integrated values is normalized into a comparable value by the size of the area from which it is extracted. The subtraction circuits 74 and 75 which receive the the outputs of the area correction circuits 111 and 112 and those of the area correction circuits 113 and 114 are arranged to compute difference information between the mean luminance component values obtained from the integration circuits 70, 71, 72 and 73 and supply the difference information to the absolute value circuits 76 and 77. The absolute value circuits 76 and 77 are arranged to obtain the absolute values of the difference information and to supply these absolute values to the microcomputer 79 via an A/D converter 78.

Upon receipt of the above stated data, the microcomputer 79 makes a check to find which of these absolute values is larger and supplies gate information indicative of the gate corresponding to the larger value to the gate pulse generating circuit 80. With the data received from the absolute value circuit 76 assumed to be F1 and the data received from the other absolute value circuit 77 to be G1, for example, a relation of F1>G1 indicates that the main object is of a large size as it corresponds to a case shown in FIG. 7(b). In this case, information indicative of that the size of the gate F is close to that of the main object is supplied to the gate pulse generating circuit 80 to have the focus detecting area set in a relatively wide state. In other words, since the luminance component exists in a greater amount at the main object' image part, a luminance difference between the inside and outside areas is obtainable at a maximum value if the gate is set in a size large enough to contain nearly the whole main object's image. In the case of F1>G1, therefore, the main object's image can be considered to be more in the gate F than in the gate G. In the event of a relation F1<G1, this relation corresponds to a case shown in FIG. 7(d) and, therefore, the main object can be regarded as small in size. Then, information indicative of detection of the gate G is supplied to the gate pulse generating circuit 80 for setting the focus detecting area in a rather small size.

Figure 7A:
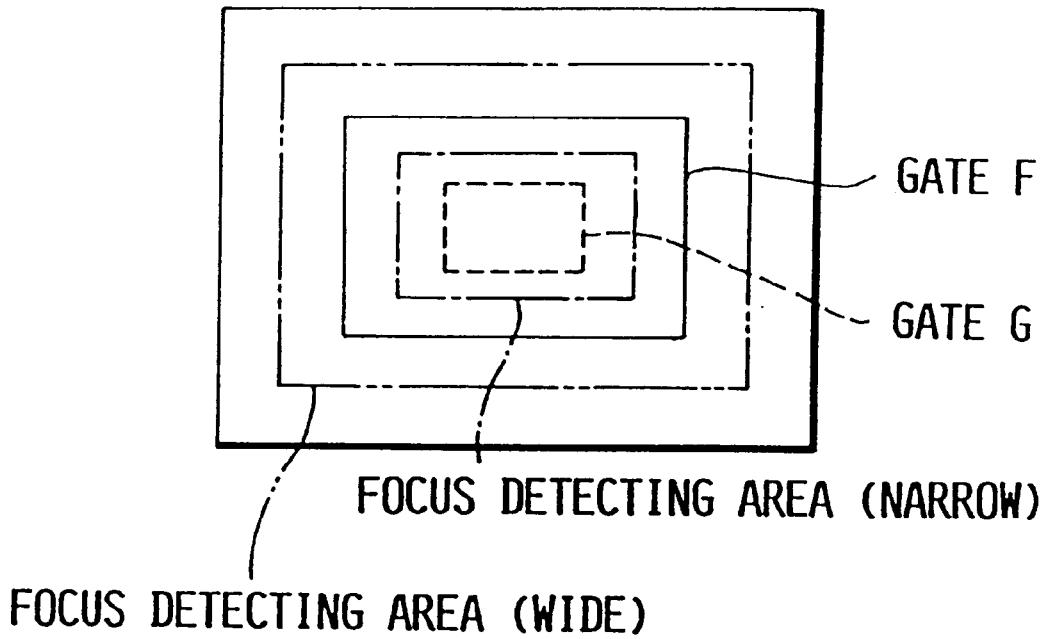
FIGS. 7(a) to 7(e) show tracing gates of varied sizes in relation to the focus detecting area.
Figure 7B:
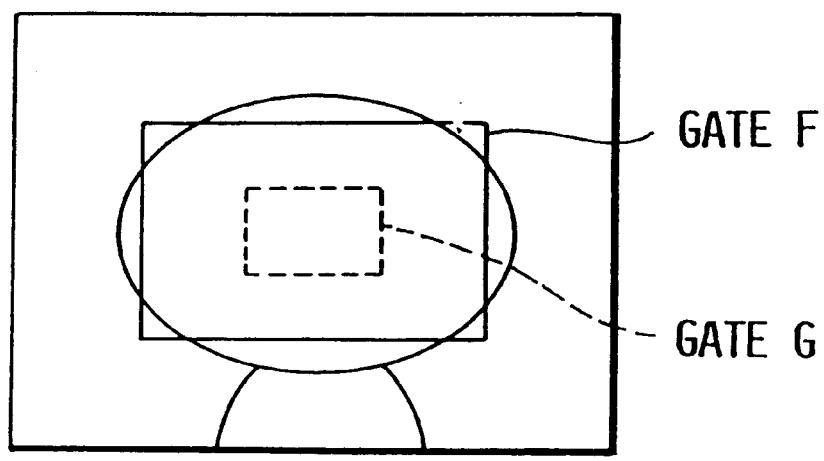
Figure 7C:
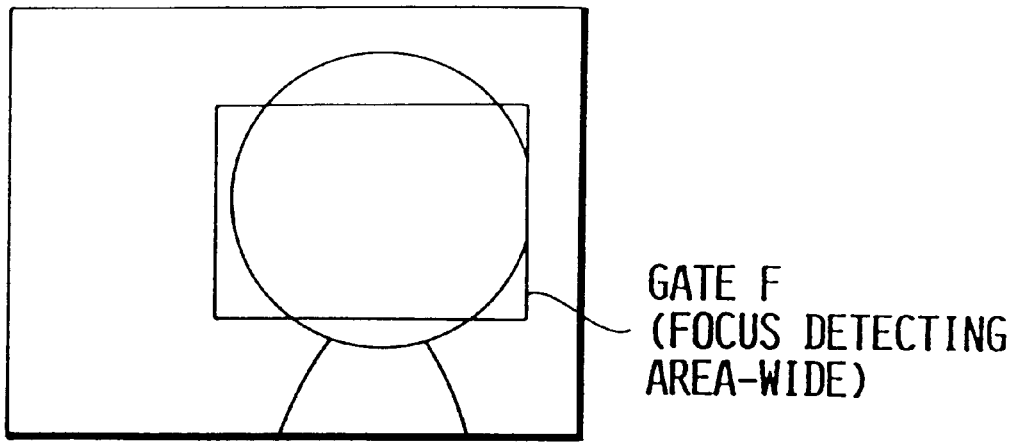
Figure 7D:
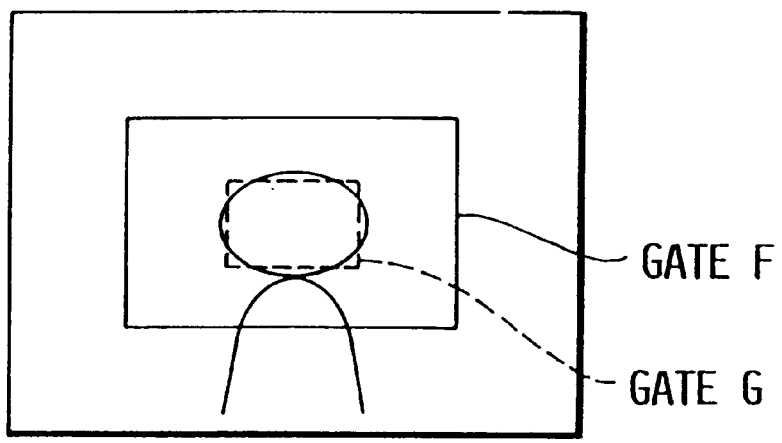
Figure 7E:
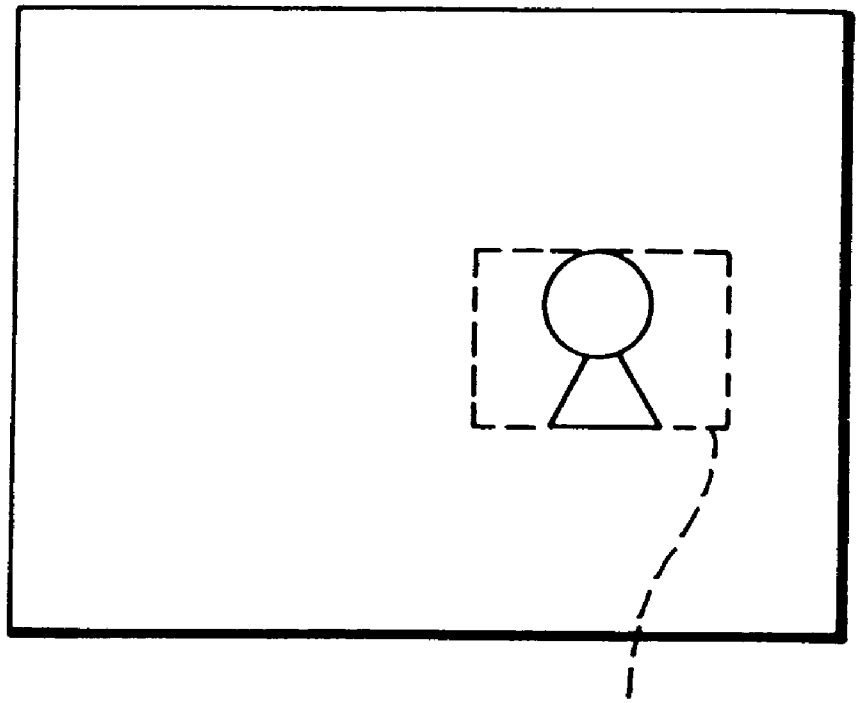

The gate circuit 65 then admits the video signal of a designated area within one field according to a gate pulse generated by the gate pulse generating circuit 80 in response to the information from the microcomputer 79. For example, if a pulse corresponding to the information indicative of the gate G is supplied to the gate circuit 65, a narrower area as represented by a one-dot-chain line in FIG. 7(a), or an area as shown in FIG. 7(e), is used as the focus detecting area. In case that the input pulse corresponds to information indicative of the gate F, a wider area as represented by a two-dot-chain line in FIG. 7(a), or an area as shown in FIG. 7(c), is used as the focus detecting area. The focus detecting area thus can be set in a size suited for the size of the main object's image obtained within the image sensing plane. This arrangement enables the focus to be accurately and reliably kept on the main object.

In the case of the embodiment shown in FIG. 6, the size of the main object on the image sensing plane is detected on the basis of the video signal, i.e. a luminance signal component thereof, obtained from the image sensor 2 via the preamplifier 3 prior to allowing it to pass through the band-pass filter 5; and the size of the focus detecting area is determined according to the detected size of the main object. However, like in the case of the second embodiment described in the foregoing, a change in the mean values of the luminance component obtained for this purpose might be offset and fail to appear even when the frequency band of the luminance component is partially changed by a change occurred in the size of the main object's image as the band of the luminance component is wide. To solve this problem, the third embodiment may be modified as shown in FIG. 8.

Figure 8:
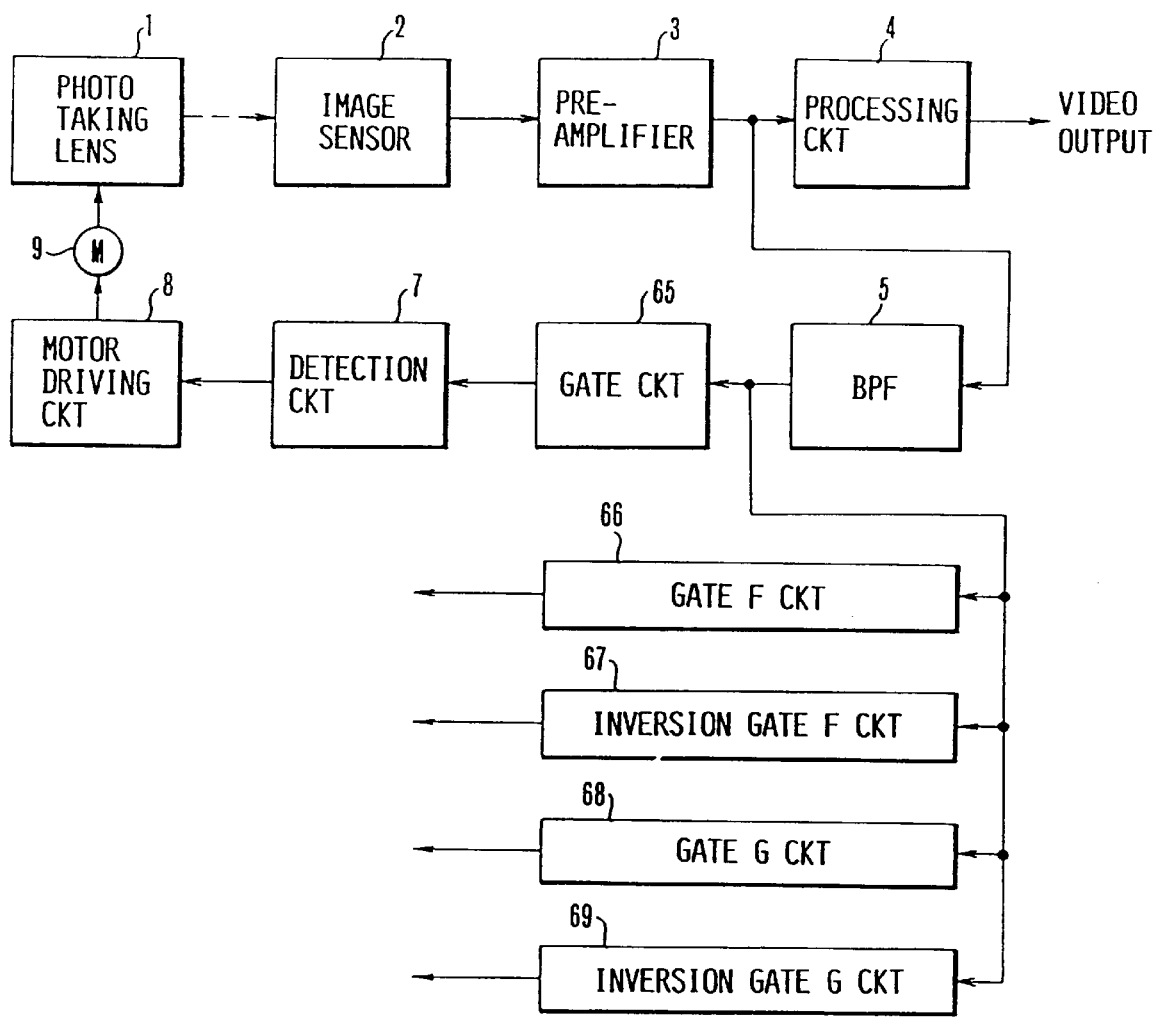
FIG. 8 is a block diagram showing in part a modification of the third embodiment.

Referring to FIG. 8, the signal component to be extracted from the inside and outside areas of each of the gates for use as a base of detecting changes occurring in the main object is arranged to be obtained on the output side of the band-pass filter 5 in such a way as to use a high frequency component located on the high band side of the luminance component. Further, FIG. 8 shows only the essential parts required in obtaining the signals to be extracted from the gates F and G. Although it is omitted from the drawing, the rest of the circuit arrangement is identical with and operates in the same manner as the circuit arrangement of FIG. 6.

While the size of the main object is detected in the above stated manner, control over an action of tracing the positional changes of the object's image on the image sensing plane resulting from a movement of the object is performed in a manner as described below:

The control over this action is performed on the basis of a control algorithm of the microcomputer 79. In the arrangement of the embodiment shown in FIGS. 6 or 8, the gates F and G are shifted (within the microcomputer 79) upward, downward, to the right or to the left to an extent of one section at a time on the image sensing plane which is divided into a plurality of sections as shown in FIG. 2. In each shifted position, luminance component (or the high frequency component) is found from the inside and outside areas of the gates as mean values. Then, a position at which the absolute value of a difference between these mean values reaches a maximum value is detected to detect the position of the main object on the image sensing plane. The focus detecting area is shifted to this position. Therefore, the focusing action can be continuously performed on the main object even in cases where the size and positions of the main object come to vary on the image sensing plane. This permits advanced automation of a focusing device.

Figure 9B:
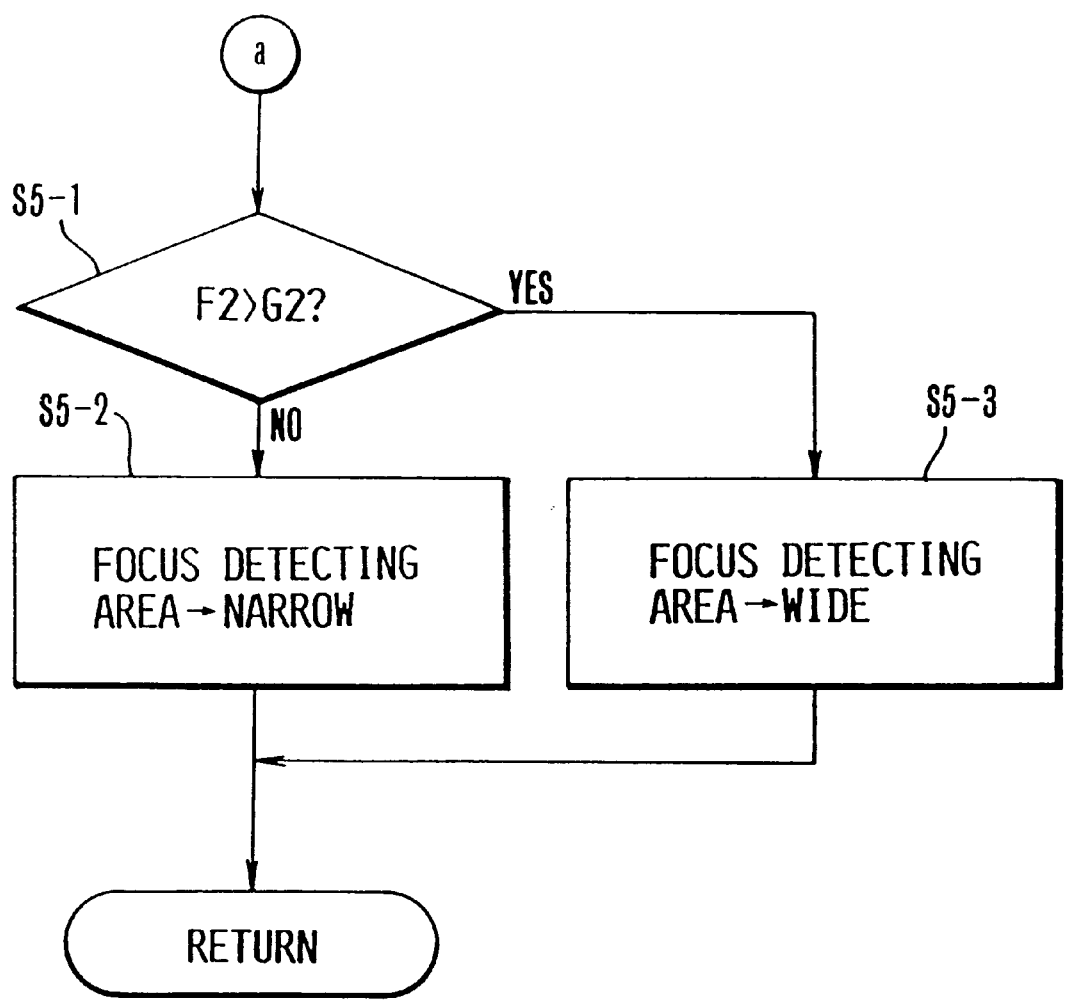
Figure 9C:
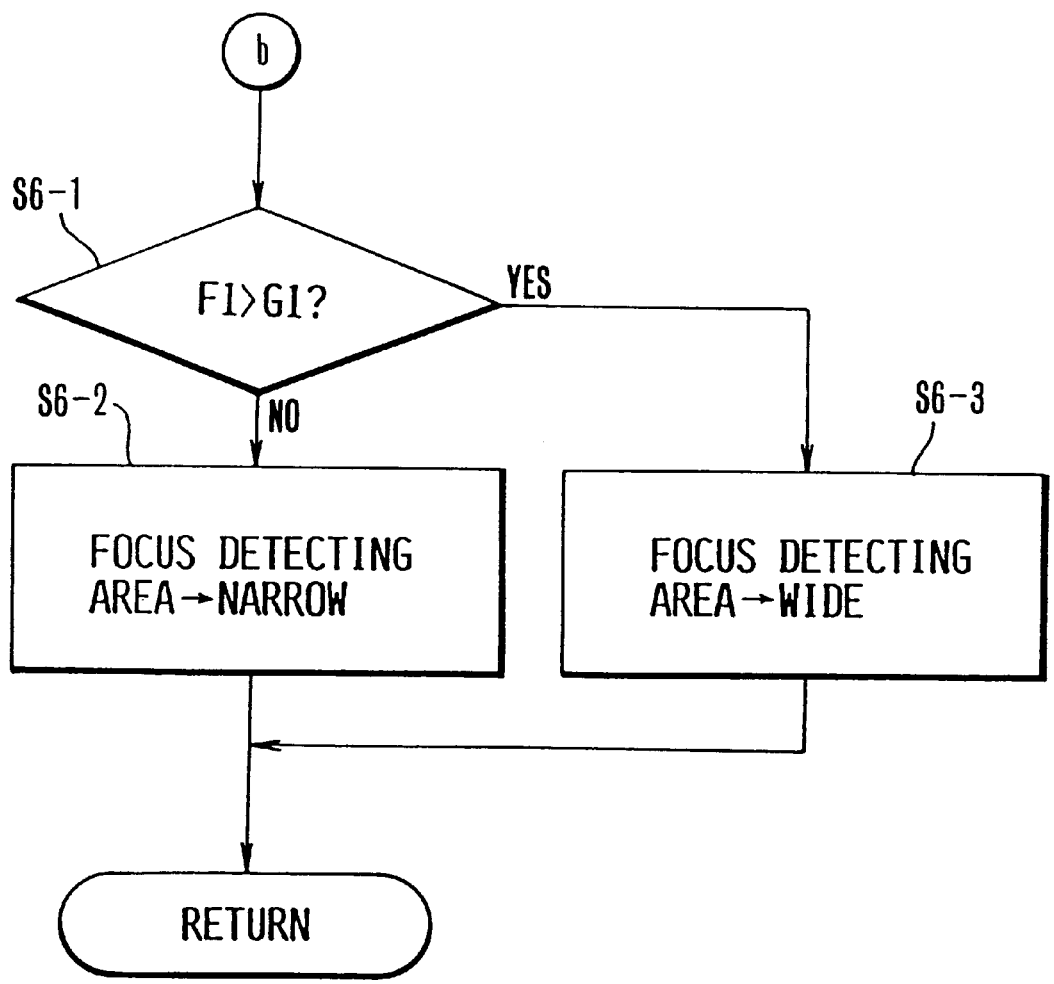

Referring to FIGS. 9(a) to 9(c) which are flow charts, the microcomputer 79 operates for the above stated tracing function as described below:

Step S1: First, a signal from the A/D conversion circuit 78 is read as data F and data G and taken in as variables F1 and G1. Step S2: Each of the gates F and G is shifted through the gate F pulse generating circuit 81 and the gate G pulse generating circuit 82 to the right to an extent of one section. Step S3: For a next field, the data F and data G are read and taken in as variables F2 and G2. Step S4: These variables are checked to see if they are in a relation of F2>F1 or G2>G1. If so, the flow of operation comes to a step S6 to be shifted to a subroutine (b) as shown in FIG. 9(c) (if the main object can be regarded as having moved to the position obtained by the right shift). The subroutine (b) is provided for selection of a size of the focus detecting area according to the size of the main object's image. At Step S6-1: The variables F1 and G1 are checked for a relation of F1>G1. If they are found to be F1>G1, the main object's image can be considered to be more securely captured on the side of the gate F as shown in FIG. 7(b). In this case, therefore, the flow comes to a step S6-3 to select the wider focus detecting area which is as shown in FIG. 7(a) with a two-dot-chain line and also in FIG. 7(c). In the case of F1>G1, the main object is adequately captured on the side of gate G as shown in FIG. 7(d). In that case, the flow proceeds to a step S6-2 to select the narrower focus detecting area which is as shown in FIG. 7(a) with a one-dot-chain line and also in FIG. 7(e). The focus detecting area is set through the gate pulse generating circuit 80.

Further, if the condition of F2>F1 or G2>G1 is not satisfied at the above stated step S4 (in such a case as where the main object has not changed its position and remains in its initial position), the flow proceeds to a step S5 to come to a subroutine (a) which is as shown in FIG. 9(b). In the subroutine (a), the size of the focus detecting area is selected according to the size of the main object. At a step S5-1 of the subroutine (a), a check is made for a condition of F2>G2. In the case of F2>G2, the main object is securely captured on the side of the gate F as shown in FIG. 7(b). In this case, therefore, the flow comes to a step S5-3 to select the wider focus detecting area as shown in FIG. 7(a) with the two-dot-chain line and also in FIG. 7(c). If the condition of F2>G2 is not satisfied, the main object is securely captured on the side of the gate G as shown in FIG. 7(d). In that case, the flow comes to a step S5-2 to select the narrower focus detecting area as shown with the one-dot-chain line in FIG. 7(a) and in FIG. 7(e). After that, the flow comes to a step S7. Step S7: The gates F and G are shifted to the left to an extent corresponding to one section to bring them backward by one section. Step S8: The position of the focus detecting area is adjusted to the gate F or G.

Following this, steps of flow from a step S9 to a step S16 are executed in a manner similarly to the above stated steps to shift the gates upward to an extent of one section for next two fields; and the position of the focus detecting area is adjusted to the gate position thus obtained. At steps from S17 to S24: The gates are shifted to the left by one section for next two fields and the position of the focus detecting area is adjusted to the shifted gate position. At steps from S25 to S32: The gates are shifted downward by one section for two ensuing fields and the position of the focus detecting area is adjusted to the gate position thus obtained. At each of the steps S13, S21 and S29, a subroutine is executed in the same manner as the subroutine of the step S5. At each of the steps S14, S22 and S30, a subroutine is executed in the same manner as the subroutine of the step S6. The same flow of operation is repeated thereafter. As described above, the gates F and G are shifted within the image (sensing) plane. The focus detecting area is shifted in the direction in which a difference in luminance (or a high frequency component) between the areas located inside and outside of each of the gates becomes greater. In other words, the focus detecting area is allowed to trace a change taking place in the position of the main object on the image plane. Further, one of the gates F and G which comes to have a larger luminance difference between the inside and outside areas thereof than the other is selected. The focus detecting area thus can be set according to the position and size of the main object within the image plane. The size of the main object's image is detected in the following manner which is based on a concept similar to the concept on which the positional change of the main object is arranged to be detected:

The luminance component is distributed in a greater degree to a part of the image sensing plane having the object's image. With the mean value of differences in luminance between the inside and outside areas of each of the gates F and G obtained, if the mean luminance difference value of the gate F is larger than that of the gate G, the gate G can be regarded as having not much changes in the object's image as there is only a small luminance difference between the inside and outside areas of the gate G. This indicates either the presence of similar objects on both the inner and outer sides of the gate G or the absence of any object on both sides. In this case, since the gate F has a larger luminance difference between its inside and outside areas than the gate G, the gate F can be regarded as having an object within the inside area thereof. In other words, the invented arrangement is detecting not only a change in the position of the main object within the image plane but also a change in the size of the object. Further, both the gates would have no luminance component neither within the inside areas nor within the outside areas, if there is no object's image on the image plane. This condition is, therefore, readily discernible.

Such being the concept, the microcomputer 79 is arranged to supply the gate pulse generating circuit 80 with a signal indicative of one of the gates F and G which is concerned with the size of the main object's image on the image sensing plane and another signal indicative of one of the gates which is concerned with the position of the main object. The gate circuit 65 then allows to pass therethrough a video signal obtained within a designated area according to a gate pulse which is generated by the gate pulse generating circuit 80 in response to the above stated instruction signal from the microcomputer 79. This arrangement permits a continuous, accurate focusing action on the main object or objects always tracing the objects even in cases where main objects of varied sizes move within the image sensing plane.

Figure 10:
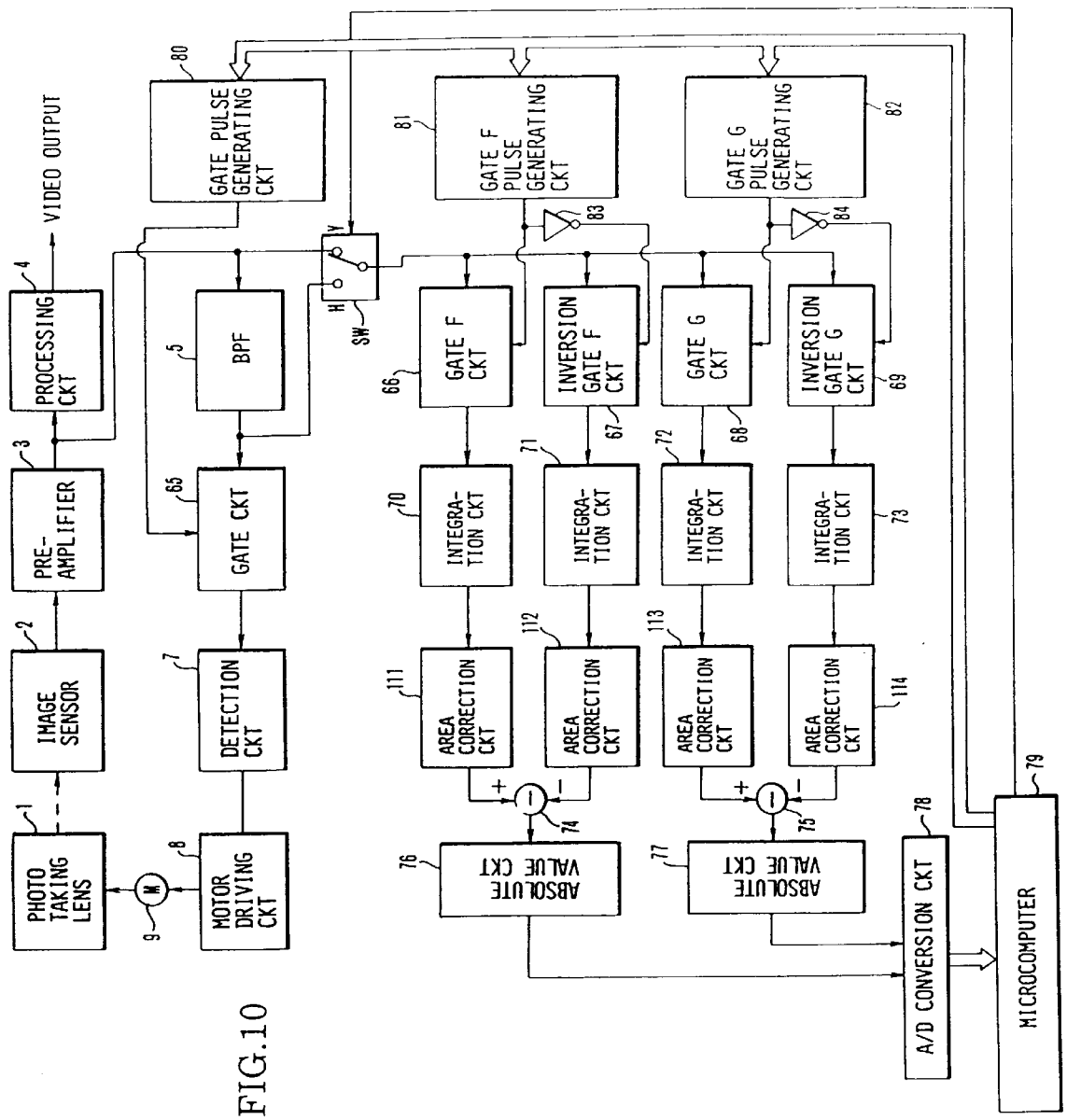
FIG. 10 is a block diagram showing a fourth embodiment of the invention.

FIG. 10 shows a fifth embodiment of the invention in a block diagram. The embodiment is arranged to automatically select according to current conditions one of two different modes. In one mode, a focus detecting area is set by detecting a luminance component which has a broad range of adaptability for various objects to be photographed. In the other, a focus detecting area is set by detecting a high frequency component which permits detection of such a change in the object that does not appear as a difference in the mean value of the luminance component. In FIG. 10, the same parts as those of the third embodiment shown in FIG. 6 are indicated by the same reference numerals. The fifth embodiment differs from the third embodiment in the following point: The signal to be supplied to the gate F circuit 66, the inversion gate F circuit 67, the gate G circuit 68 and the inversion gate G circuit 69 is arranged to be obtained either from the input side of the band-pass filter 5 (luminance component) or from the output side of the band-pass filter 5 (high frequency component) through the selecting action of an analog switch SW. Further, the microcomputer 79 is arranged to control the selecting action of the analog switch SW in addition to its functions of detecting the size and location on the image sensing plane of the object to be photographed and performing control to adjust the focus detecting area to the result of detection.

Figure 11:
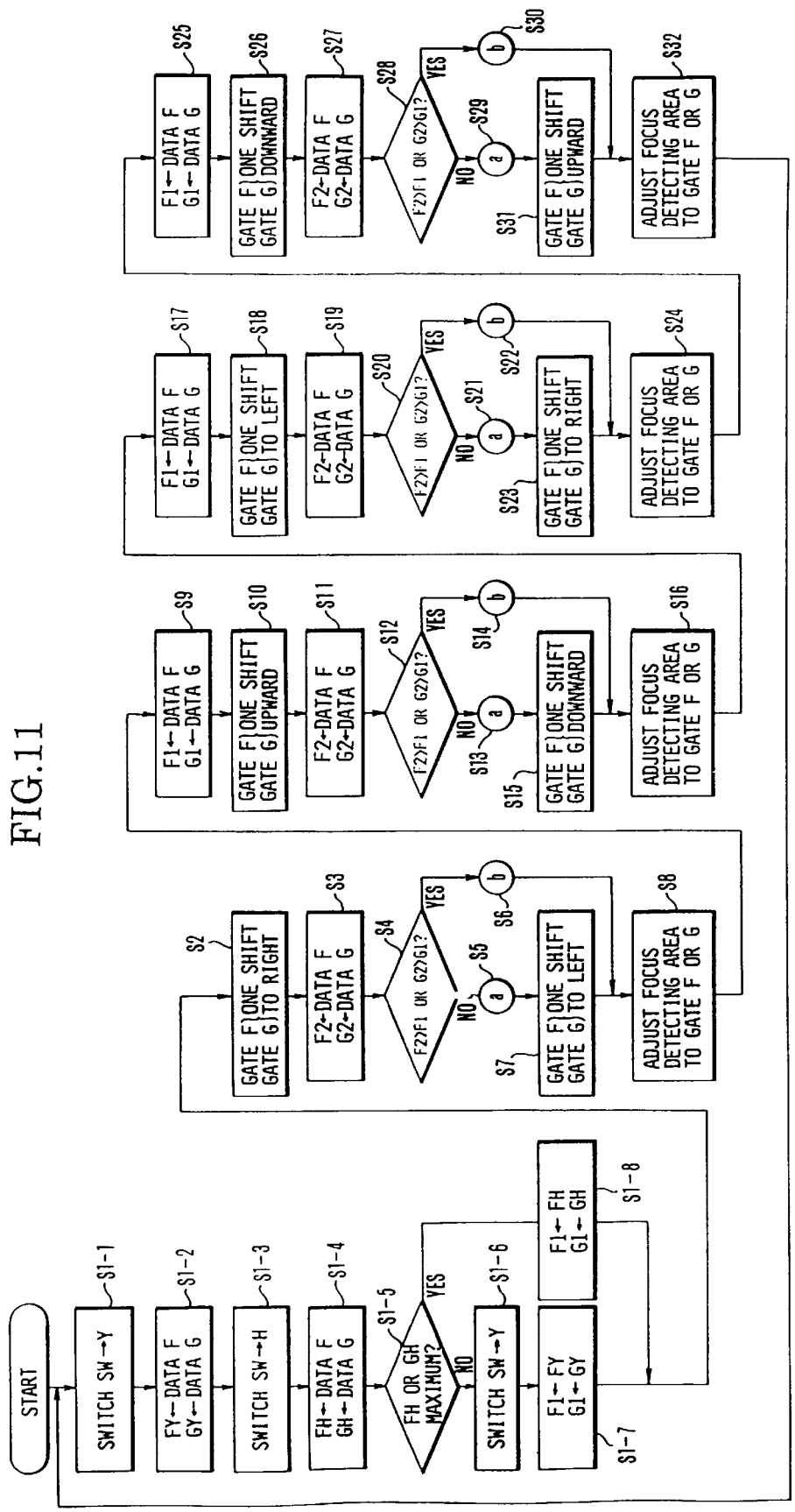
FIG. 11 is a flow chart showing the operation of the fourth embodiment.

Referring to FIG. 11 which is a flow chart, the fifth embodiment operates as follows: With a focus detecting action commenced, at a step S1-1: The position of the analog switch SW is shifted to its contact Y to take out the luminance component from the input side of the band-pass filter 5. Step S1-2: Variables FY and GY are obtained by reading values obtained on the basis of mean value differences between values of the luminance component obtained from the inside and outside areas of the gates F and G. Step S1-3: Following this, the position of the analog switch SW is shifted to another contact H to take out the high frequency component from the output side of the band-pass filter 5.

Step S1-4: Variables FH and GH are obtained by reading values obtained on the basis of mean value differences between values of the high frequency component obtained from the inside and outside areas of the gates F and G. The flow of operation then proceeds to a step S1-5. At the step S1-5: A check is made to find which is the largest among the variables FH, GH, FY and GY. If the variable FH or GH is found to be of the largest value, for example, the flow comes to a step S1-8 to store the contents of the variables FH and GH in variables F1 and G1 respectively. After that, the flow proceeds to a step S2. Further, if the variable FY or GY is found to be of the largest value at the step S1-5, the flow proceeds to a step S1-6. At the step S1-6, the analog switch SW is shifted to the contact Y to obtain the detecting mode of using the luminance component. Then, at a step S1-7, the contents of the variables FY and GY are stored in the variables F1 and G1. After that, the flow proceeds to the step S2.

Steps from the step S2 through a step S32 are executed in the same manner as in the case of FIG. 9(a) and therefore are omitted from description.

The embodiments shown in FIGS. 1 to 11 are arranged to obtain the absolute value of a difference between the inside and outside areas of each of the gates in respect of the luminance component of the video signal or a high frequency component located on the high band side of the luminance component which is obtained from these areas; and to shift the position of the focus detecting area to the inside area of the gate having the largest absolute difference value. This arrangement enables the embodiment to continuously perform a focusing action on the main object by automatically tracing it even in cases where the main object comes to move within the image sensing plane.

In the case of the embodiments shown in FIGS. 6 and 10, they are incapable of making comparison simultaneously in four directions like in the cases of the first embodiment shown in FIGS. 1, 1(a) and 1(b). However, since they are arranged to make comparison four times making it in one direction at each time, they are capable of performing about the same function with a less amount of hardware. Further, they are arranged to be capable of obtaining the absolute values of the mean values of differences either in the luminance component or the high frequency component obtained from the gates F and G which have their inside and outside areas in different sizes. This enables them to detect not only the location of the main object's image but also the size thereof. Therefore, they are capable of highly reliably continuing a focusing action on objects of varied sizes by tracing the changes occurring in the objects' images. The conventional known automatic focusing devices include two types. In one type, the focus detecting area is fixedly set in a relatively wide area on the image sensing plane. In the other, the focus detecting area is fixedly set in a relatively narrow area on the image sensing plane. In the former type, objects other than the main object might enter the focus detecting area or might be brought into the focus detecting area by a movement of the camera. Then, the lens might be focused on a wrong object. In the latter type, although it may lessen the possibility of intrusion of any unimportant object into the focus detecting area, the main object tends to slip out from the focus detecting area. Then, as mentioned in the foregoing, it might often become necessary to restart the focusing action. Whereas, the embodiment is capable of keeping the lens in focus on the main object by tracing changes thereof. In the case of the fifth embodiment shown in FIG. 10, a discrimination is made between the mode of using the luminance component and another mode of using the high frequency component for finding which of them is more advantageous. Then the focus detecting area is set by operating the analog switch SW to select the mode found to be more advantageous. This enables the embodiment to keep an in-focus state on the main object with high degree of reliability irrespectively of the photographing conditions and the object's conditions.

In accordance with this invention, as described in the foregoing, there are provided area setting means which is arranged to set, within an image sensing plane, a tracing inner area and a tracing outer area surrounding the inner area, the inner and outer areas being arranged to be movable; computing means for obtaining information on a difference between the value of a given frequency component of the video signal obtained from each moving position of the tracing inner area and that of the same frequency component obtained from each moving position of the tracing outer area with these areas moved within the image sensing plane; position determining means for determining the position of an object to be photographed within the image sensing plane from the difference information obtained by the computing means; and focus detecting area shifting means for shifting a focus detecting area to the position of the main object's image within the image sensing plane as determined by the determining means. The main object's image is considered to have moved in the direction in which the difference in the given frequency component of the video signal (i.e., a luminance component or a high frequency component on the high band side thereof) between the tracing inner and outer areas increases. This arrangement enables the automatic focusing device according to the invention to perform a focusing action on the main object without interruption even when the position of the main object's image changes within the image sensing plane.

Further, the automatic focusing device arranged in accordance with this invention comprises: an area 19 setting means for setting, within an image sensing plane, an inner area in varied sizes and an outer area surrounding the inner area; computing means for obtaining information on values of difference between the inner and outer areas in respect of a given frequency component of a video signal obtained from these areas, with the inner area set at each of the varied sizes; determining means for determining the size of a main object's image within the image sensing plane from the difference information values obtained by the computing means; and size changing means for changing the size of a focus detecting area according to the size of the object determined by the determining means. The device is thus arranged to change the size of the focus detecting area according to the size of the object as determined by the determining means. More specifically, the size of the focus detecting area is increased when the image of the object is relatively large and decreased when the object's image is relatively small. This arrangement enables the device to continuously perform a focusing action on main objects of varied sizes without being affected by the presence of objects other than the main object.

What is claimed is:

1. A video camera apparatus, comprising:
    (A) image sensing means for photoelectrically converting an object image formed on an image sensing plane to produce and output an image signal;
    (B) area setting means for setting a detecting area for detecting a photographing state of the object image on said image sensing plane;
    (C) detecting means for detecting a variation of a feature of the object image on the basis of the image signal corresponding to said detecting area in a first period of time;

(D) control means for controlling said area setting means in a second period of time longer than said first period of time in accordance with an output of said detecting means and for causing the position and size of said detecting area on said image sensing plane to follow the variation of the feature of said object image, to independently change said detecting area in the first period;

(E) focus detecting area setting means for setting a position of a focus detecting area in the second period of time at a center of said detecting area on said image sensing plane on the basis of the output of said detecting means; and (F) focus control means for adjusting a focus condition in the second period on the basis of the image signal corresponding to said focus detecting area.

2. An apparatus according to claim 1, wherein said detecting means is arranged to detect a difference of levels of high frequency components in said image signal corresponding to an inside and an outside of said detecting area.

3. An apparatus according to claim 2, wherein said control means is arranged to shift the position to a position where the difference of levels of the high frequency components at the inside and the outside of the detecting area becomes maximum, in respect of said respective detecting area.

4. An apparatus according to claim 2, wherein said focus detecting area setting means is arranged to use, as the focus detecting area, the detecting area where the difference of levels of the high frequency components at the inside and outside of the detecting area becomes maximum.

5. A video processing apparatus, comprising:

(A) area setting means for setting a plurality of work areas for measuring a position and/or size of an object image on an image plane;

(B) detecting means for detecting a variation of the object image on the basis of a variation of predetermined signal components in an image signal in respect of an inner and outer part of the respective ones of said plurality of work areas in a first period of time;

(C) control means for controlling said area setting means in accordance with an output of said detecting means and for measuring the position and/or size of the object image by causing the positions and/or sizes of said plurality of work areas on said image plane to follow the variation of the object image, to independently change the work areas, respectively in the first period of time; and (D) processing area setting means for setting in a second period of time longer than the first period of time a processing area at a position of the work area where the predetermined signal component becomes maximum among said plurality of work areas.

6. An apparatus according to claim 5, further comprising correcting means for correcting the difference of levels of the predetermined signal component based on difference of sizes of said work areas.

7. An apparatus according to claim 5, wherein said control means is arranged to shift said plurality of work areas so that a difference of luminance between the inside and the outside of each area becomes maximum.

8. An apparatus according to claim 5, wherein said processing area setting means is arranged to adopt the work area where the difference of levels of the high frequency component between the inside and the outside of the area becomes maximum, as the processing area.

9. A video camera device, comprising:

(A) image sensing means for photoelectrically converting an object image formed on an image sensing plane to produce and output an image signal;

(B) area setting means for setting detecting areas on said image sensing plane;

(C) detecting means for detecting a variation of the object image in a first period of time;

(D) control means for controlling said area setting means in accordance with an output of said detecting means in a second period of time longer than the first period of time and for causing a position and a size of the detecting area on said image sensing plane to follow the variation of the object image in the second period; and (E) focus detecting means for detecting a focus state in the first period on the basis of said image signal corresponding to the detecting area.

10. A device according to claim 9, wherein said detecting means is arranged to detect a difference of levels of a high frequency component of a luminance signal in said image signal between the inside and outside of the detecting area.

11. A device according to claim 10, wherein said control means is arranged to change a size of the detecting area so that a difference of level of the high frequency component between the inside and the outside of the detecting area becomes maximum, in respect to the respective ones of said detecting areas.

12. A device according to claim 10, wherein said focus detecting means is arranged to adopt the detecting area where the difference of level of the high frequency component between the inside and outside becomes maximum among said plurality of detecting areas, as a focus detecting area.

13. A video processing device, comprising:

(A) imaging means for producing and outputting an image signal;

(B) area setting means for shiftably setting a processing area in an image plane;

(C) detecting means for detecting a variation of an object image on the basis of a variation of a predetermined signal component in said image signal in a first period of time;

(D) control means for controlling said area setting means in accordance with an output of said detecting means and for changing a position and a size of said processing area on said image plane, following the change of the object image in a second period of, time longer than the first period; and (E) processing means for performing a predetermined process on the image signal corresponding to the processing area in the first period.

14. A device according to claim 13, wherein said processing means is focusing control means for detecting a focus state on the basis of the image signal corresponding to the inside of said processing area and for driving a focusing lens to an in-focus point.

15. A device according to claim 14, wherein said area setting means is capable of setting a plurality of processing areas having different sizes.

16. A video processing method, comprising:

(A) area setting step for setting a plurality of work areas for measuring a position and/or size of an object image on a image plane;

(B) detecting step for detecting a variation of the object image on the basis of a variation of predetermined signal components in an image signal in respect of an inner and outer part of the respective ones of said plurality of work areas in a first period of time;

(C) control step for controlling a process of said area setting step in accordance with an output of said detecting step and for measuring the position and/or size of the object image by causing the positions and/or sizes of said plurality of work areas on said image plane to follow the variation of the object image, to independently change the work areas, respectively in the first period of time; and (D) processing area setting step for setting in a second period of time longer than the first period of time a processing area at a position of the work area where the predetermined signal component becomes maximum among said plurality of work areas.

17. A method according to claim 16, further comprising correcting step for correcting the difference of levels of the predetermined signal component based on difference of sizes of said work areas.

18. A method according to claim 16, wherein said control step performs to shift said plurality of work areas so that a difference of luminance between the inside and the outside of each work area becomes maximum.

19. A method according to claim 16, wherein said processing area setting step adopts the work area where the difference of levels of the high frequency component between the inside and the outside of the area becomes maximum, as the processing area.

* * * * *

UNITED STATES PATENT AND TRADEMARK OFFICE
CERTIFICATE OF CORRECTION

PATENT NO.    : 6,088,060
DATED         : July 11, 2000
INVENTOR(S)   : Hirofumi Suda, et al.

Page 1 of 1

It is certified that error appears in the above-identified patent and that said Letters Patent is hereby corrected as shown below:

<u>Column 1,</u>
Line 47, delete "perform s" and insert -- performs --.

<u>Column 5,</u>
Line 7, delete "there a video" and insert -- therethrough a video --.
Line 43, delete "there the video" and insert -- therethrough a video --.
Line 52, delete "designate area" and insert -- designated area --.

Signed and Sealed this

Second Day of October, 2001

*Attest:*

NICHOLAS P. GODICI
*Attesting Officer*    Acting Director of the United States Patent and Trademark Office